W. C. STEVENS.
DEVICE FOR BUILDING TIRES ON RIMS.
APPLICATION FILED JAN. 13, 1913.
1,080,860.
Patented Dec. 9, 1913.
3 SHEETS—SHEET 1.
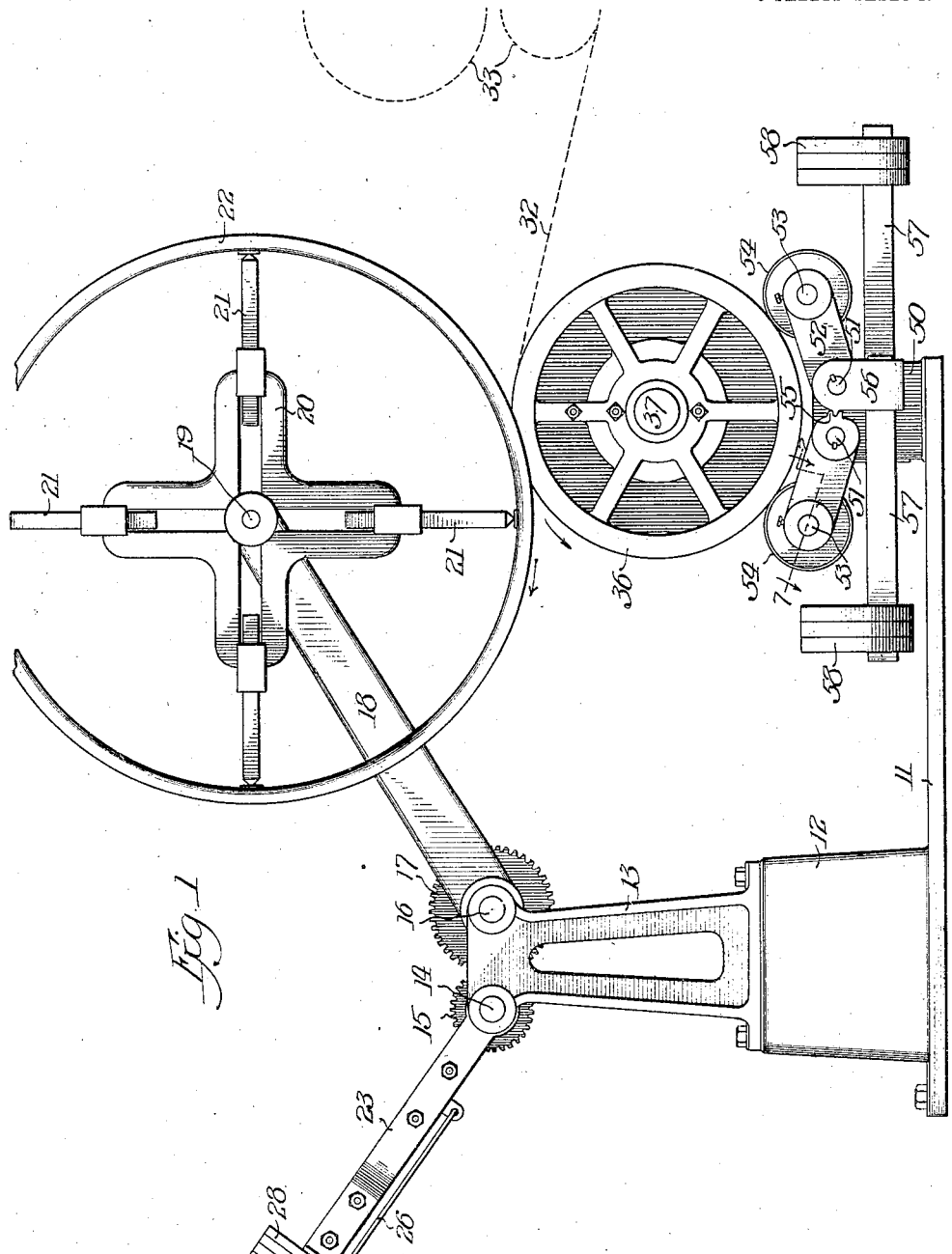
Inventor
William C. Stevens.

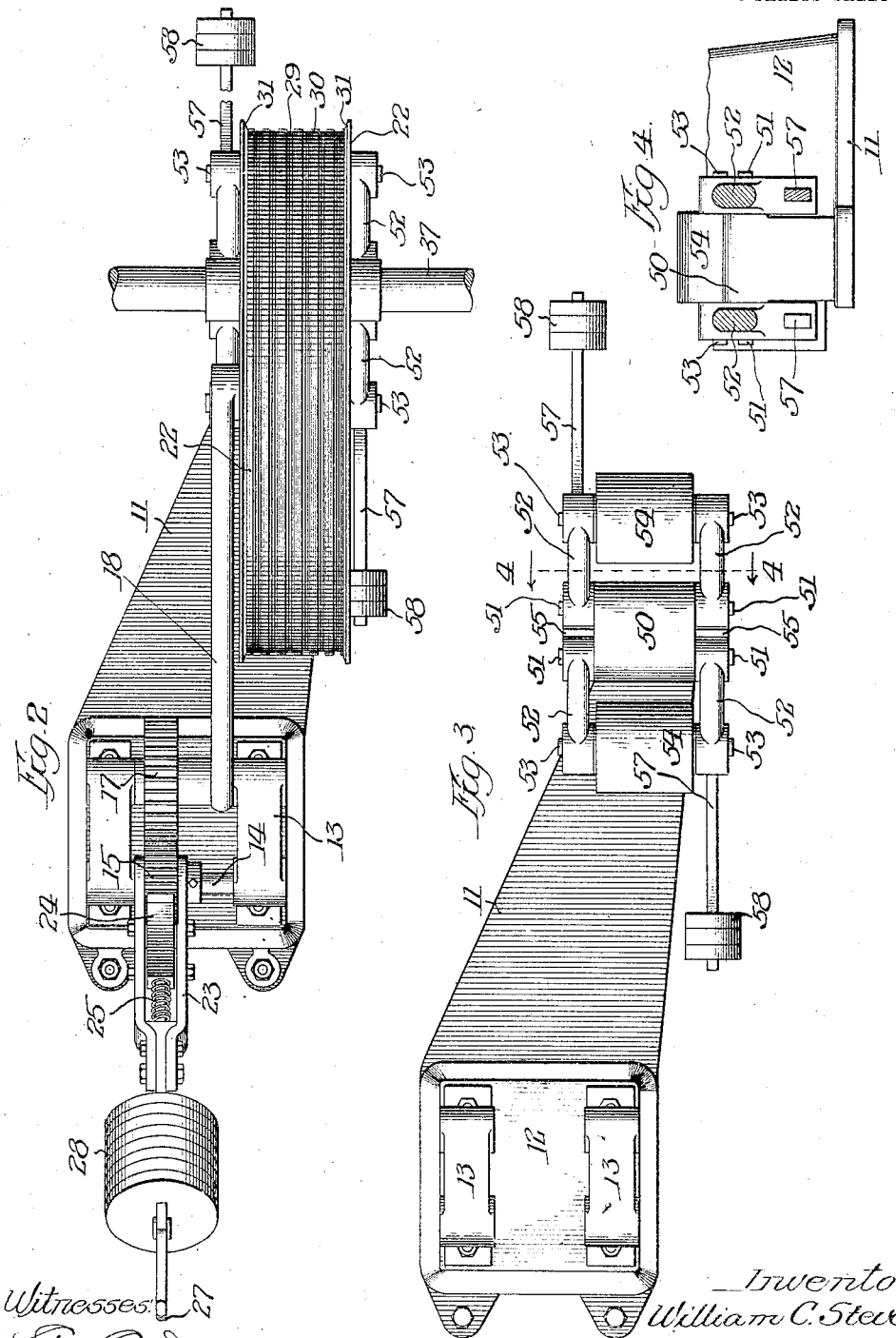

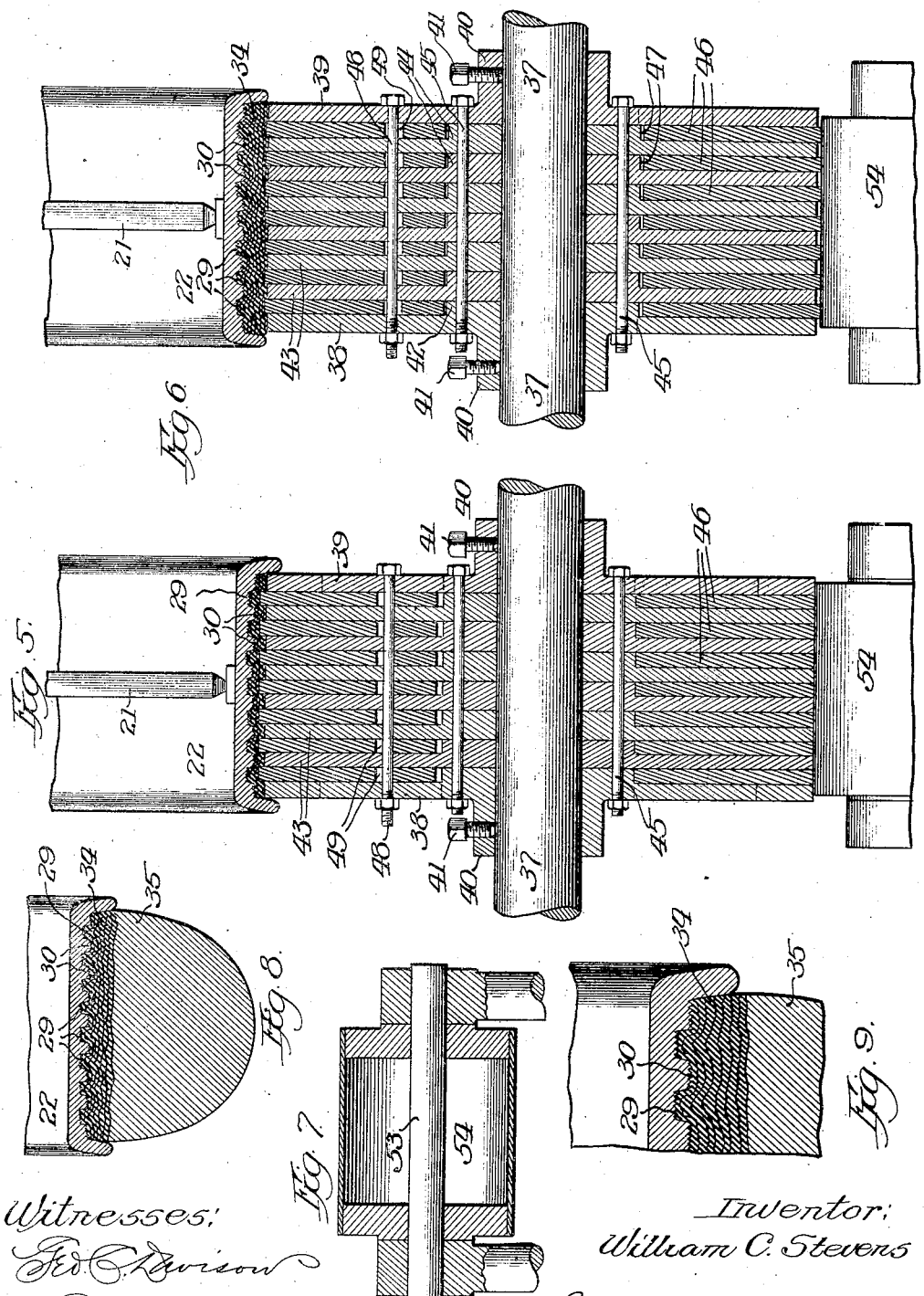

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

DEVICE FOR BUILDING TIRES ON RIMS.

1,080,860.  Specification of Letters Patent.  Patented Dec. 9, 1913.

Application filed January 13, 1913. Serial No. 741,681.

*To all whom it may concern:*

Be it known that I, WILLIAM C. STEVENS, a citizen of the United States, residing at Akron, in the county of Summit and State of Ohio, have invented certain new and useful Improvements in Devices for Building Tires on Rims, of which the following is a specification.

This invention relates to the art of making rubber tires and particularly to the building up of solid rubber tires upon a metallic rim.

It is usual in this art to make the tire of a composite nature, that is to say, the tread is of one sort of soft rubber particularly suited to take up the jars incident to travel and that portion of the tire next the rim is of a harder firmer rubber capable of being vulcanized into intimate adhering contact with the wheel rim on the one hand and with the softer rubber tread on the other, the result being a composite tire of which the parts are substantially integral with each other and with the rim.

In order to increase the area of contact between the rubber tire and the metal rim and thus render the union therebetween less liable to rupture the rim face is advantageously roughened and also provided with a series of longitudinal grooves or corrugations. It is necessary with such grooved rim, however, to force the rubber into these grooves as it is applied to the rim and to compact the rubber layers as they are added and progressively approach a plane surface.

Having as an object an improved tire of this type the invention resides in improved means for effecting such an intimate application of the component parts of the tire to each other and to the rim in an efficient and inexpensive manner.

In the accompanying drawings and in the following detailed description based thereon I have set forth a preferred embodiment of the invention, it being understood that, the invention not being dependent upon the specific construction employed, the drawings and the description are to be taken in an illustrative and not an unnecessarily limiting sense.

In the drawings. Figure 1 is a side elevation of a machine embodying the invention; Fig. 2 is a top plan view of the same; Fig. 3 is a similar view with portions of the super-structure removed; Fig. 4 is a transverse section on the line 4—4 of Fig. 3; Fig. 5 is a vertical section, the compacting roller showing adjacent coöperating portions of the rim and pressure roller at one stage of the operation; Fig. 6 is a similar view at an advanced stage of the operation; Fig. 7 is a detail sectional view on the line 7—7 of Fig. 1; Fig. 8 is a cross section through the rim and completed tire; and Fig. 9 is a fragmentary view of a part of Fig. 8 on an enlarged scale.

Having reference to the drawings in detail, the reference numeral 11 designates a base plate supporting a pedestal 12 upon which a frame 13 is mounted. In the upper portion of the frame is journaled a shaft 14 carrying a pinion 15 and also a shaft 16 carrying a pinion 17, the two pinions 15 and 17 being in mesh one with another. Upon the shaft 16 is mounted in fixed relation to the pinion 17 one end of an arm 18, upon the opposite end of which is rotatably mounted at 19 a spider 20 having telescopically adjustable fingers 21 for supporting in a rotatable manner a wheel rim 22. A second arm 23 is mounted at one end upon the shaft 14 in adjustable relation to the pinion 15 such adjustment being provided for by means of a dog 24 engaging the teeth of the pinion 15 under the influence of the spring 25, the release of the dog being effected at will by means of a rod 26 controlled by a lever 27. A weight 28 is carried by the arm 23 the effectiveness of the weight dependent upon the angle of the arm 23 which is adjustable, as will be readily understood, by varying the point of engagement of the dog 24 with the pinion 15.

The face of the rim 22 is provided with a plurality of peripheral corrugations or grooves 29 between intervening ridges 30 in order to increase the superficial area of the rim face and the grooves and ridges are also advantageously roughened for the same purpose, the rim also having side flanges 31 as is usual, and upon this grooved and roughened rim is built up a tire by the application thereto of successive layers of sheet rubber, indicated at 32 by dotted lines in Fig. 1, as being supplied from feed rolls 33.

By reason of the fact that hard rubber of a certain composition can be effectively vulcanized on to metal while soft rubber of a composition adapted for use as a tread cannot be vulcanized on to metal, and the further fact that these two kinds of rubber can be vulcanized one to the other, the tire is built up by first applying to the rim successive layers of the harder rubber and then applying layers of the softer rubber in order to form the tread portion. In Figs. 8 and 9 the harder rubber base is indicated at 34 and the softer rubber at 35. By reference to these figures it will be readily understood that the first layers of the hard rubber if suitably compacted within the grooves 29 will present a surface which is likewise grooved and that as successive layers are added the surface will desirably tend to a plane surface, the demarcation between the grooved and ridged portions becoming less distinct as successive layers are added. The proper compacting of the rubber layers within the grooves and one upon another presents a problem. If a ridged compacting roller is employed having an unyielding surface to force the rubber into the grooves the progressively built-up hard rubber layer will retain the same contour, and if, on the other hand, a compacting roller is employed having a plane surface the layers of rubber will not be forced into the grooves. As conditions are progressively changing during the building up of the hard rubber layer a compacting roller of progressively changing face is desirable in order to avoid the necessity of employing a number of compacting rollers of different face and changing the same at short intervals, and I have herein shown and will now describe such a compacting roller. Beneath the rim 22, as it is rotatably mounted upon the rim supporting arm 18, the compacting roller 36 is mounted upon a driven shaft 37, this roller comprising a pair of side plates 38 and 39 each of which has a laterally extending hub 40 secured to the shaft by means of set screws 41. The plate 39 has a plane inner face while the plate 38 has an inwardly projecting central boss 42 and between the side plates 38 and 39 are mounted a series of disks 43 each of which likewise has a central boss 44, the bosses 42 and 44 serving to space the peripheral portions of the disks and side plates apart so as to provide interspaces corresponding to the thickness of the said bosses. Tie rods 45, 45, firmly secure the side plates and disks together in fixed relation so that the disks 43 are rigidly held. During the assembling of the side plates and rigid disks other disks 46 each having a central opening 47 of slightly greater diameter than the bosses 42 and 44 are assembled therewith, a disk 46 being slipped over the boss 42 and a similar disk 46 being slipped over the bosses 44 of each of the disks 43 so that in the interspace between each pair of the disks 43 is disposed a disk 46 which by reason of the size of its aperture 47 is susceptible of movement upon the bosses within the interspaces. The relative movement of the two sets of disks is limited both radially and angularly by a pin 48 extending transversely through all of the disks, said pin 48 fitting tightly within openings of the side plates and rigid disks and loosely within larger openings 49 of the interposed disks 46. The maximum play of the disks 46 relative to the disks 43 corresponds to the depth of the grooves 29 below the outer surface of the ridges 30. Upon the base 11 is supported a second pedestal 50 within the upper portion of which a pair of shafts 51, 51 are journaled. Upon each end of each of the shafts 51 is keyed an arm 52 and connecting the free ends of each pair of the arms 52 is the axle 53 of a pressure roller 54, the two pressure rollers 54, 54 occupying positions one upon each side of a vertical line passing through the shaft 37. The adjacent ends of the arms 52 are provided with intermeshing projections or teeth 55 whereby the said arms and shafts move in unison. A plate 56 is keyed to one end of one of the shafts 51 and to the opposite end of the other shaft 51, and from each of the plates 56 extend in opposite directions an arm 57 carrying at its outer end a weight 58 adjustable thereon. It will be noted that the arms 52, the plates 56 and the arms 57 constitute Z-levers, the effect of the weights 58 being to turn the Z-levers upon their fulcrums 51 and thereby force the pressure rollers 54 yieldingly against the periphery of the compacting roller 36.

The operation of the device is as follows: By lifting upon the handle end of the arm 23, the arm 18 is likewise raised and the rim 22 with its spider 20 is positioned upon the arm 18 and when the arm 23 is released the weight 28 acting through the pinions 15 and 17 supplements the weight of the rim and spider in pressing downward upon the compacting roller 36. The rubber tape 32 being fed between the rotating roller 36 and rim 22 is compacted within the grooves 29 by means of the projecting edges of the disks 46 which are caused to project from the upper face of the compacting roller 36, as indicated in Fig. 5 by the pressure of the rollers 54 upon the lower portion of the periphery of the roller 36. As the hard rubber layer is progressively built up upon the rim 22 and the contour of the grooves and ridges is gradually effaced by the merging of one in the other in the outer layers, the projecting disks 46 are gradually forced inward as indicated in Fig. 6, the pressure rollers 54 permitting such retraction of yielding disks from the upper face of the compacting roller and their emergence from the lower face, so that when the hard rubber base is built up beyond the flanges of the rim to a point where it is desired to apply the softer rubber for the tread portion of the tire, the outer surface of such hard rubber base is substantially plane possessing at most the wavy contour indicated in Figs. 8 and 9 in the line of division between the two rubber portions.

It will thus be seen that my invention provides a compacting roller having an automatically progressively changing contact face which adapts itself to the surface contour of the material upon which it is employed in the various stages of building up the rubber tire upon a corrugated or grooved rim.

I claim:

1. The combination with a recessed body, and means to apply successive layers of plastic material thereto, of compacting means comprising members disposed side by side and being movable toward and from the recesses and in alinement therewith and means to exert yielding pressure upon the members, substantially as described.

2. The combination with a grooved rim, and means to apply successive layers of rubber thereto, of compacting means comprising yielding members disposed side by side and in alinement with the grooves, and means to exert yielding pressure upon the members, substantially as described.

3. The combination with a grooved rim, and means to apply successive layers of rubber thereto, of compacting means comprising rotatable independently yielding members disposed upon a common axis and in alinement with the grooves, and means to exert yielding pressure upon the members, substantially as described.

4. The combination with a grooved rim, and means to apply successive layers of rubber thereto, of compacting means comprising a series of yielding rotatable members disposed in planes parallel to the grooves and intervening ridges, and means to exert pressure upon the said series and through them upon the layers of material, substantially as described.

5. The combination with a grooved rim, and means to apply successive layers of rubber thereto, of compacting means comprising a series of alternating yielding and rigid rotatable disk members disposed in alinement with the grooves and intervening ridges respectively, and means to exert pressure upon the said series and through them upon the layers of material, substantially as described.

6. The combination with a grooved rim, and means to apply successive layers of rubber thereto, of a compacting roller arranged to bear against the applied layers and comprising a series of spaced rigid disks, and a series of interspaced radially displaceable disks of slightly greater diameter than the rigid disks, and a yielding pressure roller bearing against the periphery of the compacting cylinder on the side opposite the rim, substantially as described.

7. The combination with a grooved rim, and means to apply successive layers of rubber thereto, of a compacting roller arranged to bear against the applied layers and comprising a series of rigidly mounted disks having spacing bosses, and a series of interspaced radially displaceable disks mounted upon the bosses, the diameter of the displaceable disks slightly greater than that of the rigid disks, and a yielding pressure roller bearing against the periphery of the compacting roller on the side opposite the rim, substantially as described.

8. The combination with a grooved rim, and means to apply successive layers of rubber thereto, a compacting roller arranged to bear against the applied layers and comprising a series of rigidly mounted disks having spacing bosses, and a series of interspaced radially displaceable disks each having a central aperture slightly larger than and adapted to receive the bosses, the diameter of the displaceable disks slightly greater than that of the rigid disks, and a yielding pressure roller bearing against the periphery of the compacting roller on the side opposite the rim, substantially as described.

9. The combination with a grooved rim, and means to apply successive layers of rubber thereto, a compacting roller arranged to bear against the applied layers and comprising a series of rigidly mounted disks having spacing bosses, and a series of interspaced radially displaceable disks each having a central aperture slightly larger than and adapted to receive the bosses, the diameter of the displaceable disks slightly greater than that of the rigid disks, a pin connecting the series of rigid disks and passing loosely through the displaceable disks, and a yielding pressure roller bearing against the periphery of the compacting roller on the side opposite the rim, substantially as described.

10. The combination with a grooved rim, and means to apply successive layers of rubber thereto, a compacting roller arranged to bear against the applied layers and comprising a series of alternating yielding and rigid rotatable disk members disposed in alinement with the grooves and intervening ridges respectively, and means to exert pressure upon the said series and through them upon the layers of material, said means comprising a suitably journaled shaft, a lever mounted on the shaft, a roller carried by one arm of the lever and bearing on the periphery of the compacting roller, and a weight adjustably mounted on the other arm of the lever, substantially as described.

11. The combination with a grooved rim, and means to apply successive layers of rubber thereto, a compacting roller arranged to bear against the applied layers and comprising a series of alternating yielding and rigid rotatable disk members disposed in alinement with the grooves and intervening ridges respectively, and means to exert pressure upon the said series and through them upon the layers of material, said means comprising a pair of suitably journaled shafts, a lever mounted on each shaft, a pair of rollers carried one by an arm of each lever, the rollers bearing upon the compacting roller at each side of a point opposite the rim, and a weight adjustably mounted on the free arm of each lever, substantially as described.

12. The combination with a grooved rim, and means to apply successive layers of rubber thereto, a compacting roller arranged to bear against the applied layers and comprising a series of alternating yielding and rigid rotatable disk members disposed in alinement with the grooves and intervening ridges respectively, and means to exert pressure upon the said series and through them upon the layers of material, said means comprising a pair of suitably journaled shafts, a Z-lever keyed on each shaft, a roller carried by one arm of each lever, the two rollers bearing upon the compacting roller at each side of a point opposite the rim and a weight adjustably mounted on the free arm of each lever, substantially as described.

13. The combination with a grooved rim, and means to apply successive layers of rubber thereto, a compacting roller arranged to bear against the applied layers and comprising a series of alternating yielding and rigid rotatable disk members disposed in alinement with the grooves and intervening ridges respectively, and means to exert pressure upon the said series and through them upon the layers of material, said means comprising a pair of suitably journaled shafts, a lever mounted on each shaft, a pair of rollers carried one by an arm of each lever, the rollers bearing upon the compacting roller at each side of a point opposite the rim, and a weight adjustably mounted on the free arm of each lever, the two levers provided with intermeshing projections whereby they operate in unison, substantially as described.

14. The combination with a grooved rim, and means to apply successive layers of rubber thereto, a compacting roller arranged to bear against the applied layers and comprising a series of alternating yielding and rigid rotatable disk members disposed in alinement with the grooves and intervening ridges respectively, and means to exert pressure upon the said series and through them upon the layers of material, said means comprising a pair of suitably journaled shafts, a Z-lever keyed on each shaft, a roller carried by one arm of each lever, the two rollers bearing upon the compacting roller at each side of a point opposite the rim and a weight adjustably mounted on the free arm of each lever, the two levers provided with intermeshing projections whereby they operate in unison, substantially as described.

15. The combination of a frame, shafts journaled therein, intermeshing pinions mounted on the shafts, a rim supporting arm mounted in fixed relation to one pinion, a weighted arm mounted in adjustable relation to the other pinion, a rim rotatably mounted on the rim supporting arm, means for supplying successive layers of rubber tape to the rim, and a compacting roller bearing against the applied rubber layers, substantially as described.

16. The combination of a frame, shafts journaled therein, intermeshing pinions keyed upon the shafts, a rim supporting arm mounted upon one shaft in fixed relation to one pinion, a weighted arm mounted upon the other shaft, a releasable dog carried by the weighted arm and engaging its pinion, a grooved rim rotataly mounted on the rim supporting arm, means to supply rubber tape to the rim, and compacting means comprising independently yielding members disposed in alinement with the grooves, and means to exert yielding pressure upon the members, substantially as described.

17. The combination of a frame, shafts journaled therein, intermeshing pinions mounted on the shafts. a rim supporting arm mounted in fixed relation to one pinion, a weighted arm mounted in adjustable relation to the other pinion, a grooved rim rotatably mounted on the rim supporting arm, means to supply rubber tape to the rim, a compacting roller arranged to bear against the applied layers of rubber tape and comprising a series of spaced rigid disks and a series of interspaced radially displaceable disks of slightly greater diameter than the rigid disks, and means to exert yielding pressure upon the periphery of the compacting roller to force the rubber by means of the displaceable disks into the grooves, said means comprising a pair of suitably journaled shafts, a lever mounted on each shaft, a roller carried by one arm of the lever, the two rollers bearing on the compacting roller at each side of a point opposite the rim, and a weight adjustably mounted on the free arm of each lever, substantially as described.

WILLIAM C. STEVENS.

Witnesses:
S. G. CARKHUFF,
T. L. RODGERS.